Patented May 15, 1934

1,959,162

UNITED STATES PATENT OFFICE 1,959,162

ELECTRICAL DISTRIBUTION SYSTEM

Walter Guttsmann, Berlin-Charlottenburg, Germany, assignor to General Electric Company, a corporation of New York Application March 1, 1933, Serial No. 659,242
In Germany March 7, 1932

3 Claims. (Cl. 172—238)

My invention relates to electrical distribution systems and more particularly to alternating current network-type or ring distribution systems.

The general object of my invention is to provide an improved arrangement and method for independently controlling the distribution of actual and wattless power in a ring circuit.

Another object of the invention is to provide an improved arrangement of transformer connections.

A further object of the invention is to reduce the losses and increase the efficiency of transformer systems used for power control.

Figure 1:
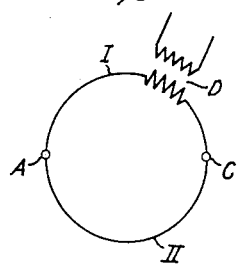
Figure 2:
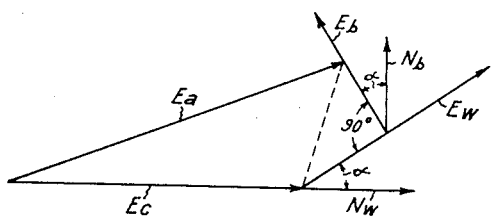
Figure 3:
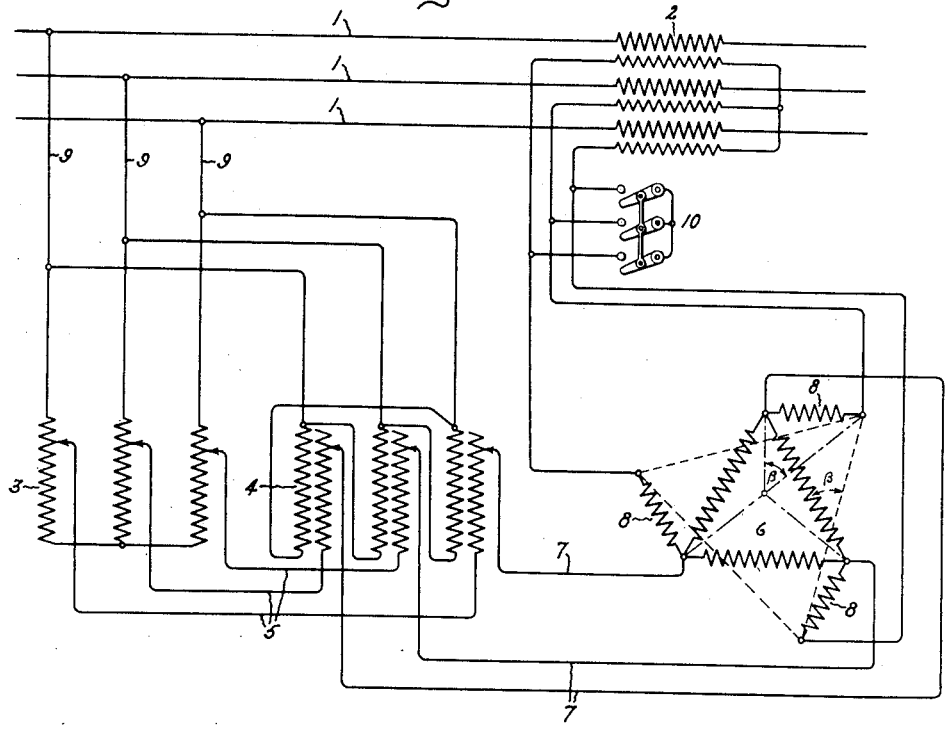

The invention will be better understood from the following description taken in connection with the accompanying drawing in which Fig. 1 shows diagrammatically an electrical ring power circuit, Fig. 2 is a vector diagram representing the voltages in the circuit shown in Fig. 1, and Fig. 3 shows a section of a three-phase circuit with a transformer system arranged and connected in accordance with the invention for independent control of the actual and wattless power flowing in the circuit.

It is well known to control the power flow in an alternating current ring network by introducing an additional voltage into the line conductors. In the accompanying drawing, Fig. 1 shows diagrammatically by way of example a ring circuit in which a power station A is interconnected to a substation C by two lines I and II. Under normal conditions, the distribution of the power supplied from A to C through the two branches I and II is inversely proportional to the ratio of the impedances of the two branches. By introducing an additional voltage by means of a series transformer D, the distribution of power between the two branches is varied not only for the actual power, but also for the wattless or reactive power. It is also often desirable to control the actual power independently of the wattless power. This requires additional voltages with certain phase angle displacements from the respective line voltages. That is, when only the actual power is to be controlled, the phase-angle between the additional voltage and the line voltage must be equal to the impedance-angle of the ring circuit, and therefore this angle is defined by the relation: $\tan \alpha = X:R$, if $X$ and $R$ are the reactance and the resistance of the whole ring circuit. The additional voltage required for controlling the distribution of wattless power must have a 90° angular displacement with respect to the "actual power controlling voltage".

Fig. 2 is a vector diagram representing the voltages in the circuit of Fig. 1. $E_A$ and $E_C$ are the vectors of the line voltages at the points A and C. $E_w$ shows the phase relation of the voltage controlling the actual power $N_w$ and is displaced by the angle alpha from the voltage $E_C$. $E_b$ is the "wattless power controlling voltage", which is in quadrature to the vector $E_w$ and is displaced by the angle alpha from the direction of the wattless current and of the wattless power $N_b$. Consequently the angular displacement between $E_w$ and $E_b$ is 90°. When the magnitude of $E_w$ is changed, the distribution of the actual power between the two branches of the ring network is alone varied, and the wattless power distribution is controlled by changing the magnitude of the voltage $E_b$.

In practicing this method of regulation in a well known system which enables a regulation of the actual power distribution only, three transformers are employed, two of which are exciting transformers with series interconnected secondary windings. The voltages of the secondary windings are displaced 90° and the voltage ratio of the two exciting transformers is such that the vector sum of the secondary voltages is displaced by the above mentioned impedance-angle alpha from the line voltage. By this resultant voltage, a third transformer is energized which is interconnected in series in the ring circuit such as the circuit D in Fig. 1, and the voltage ratio of which is variable. With such an arrangement, when the wattless power distribution is also to be regulated independently of the actual power distribution, a second regulating system of three transformers is required, in which the two exciting transformers are so dimensioned that the resultant secondary voltage which is introduced into the ring circuit by means of a separate series transformer has a 90° phase displacement from the line voltage. However, this arrangement has the disadvantage of requiring six transformers which are not only relatively expensive and require much space but also have relatively high power losses.

The invention is shown in Fig. 3 in connection with the conductors 1 forming part of a three phase electrical ring circuit such as the circuit I in Fig. 1, into which the additional voltages for controlling the distribution of power are introduced by means of a series transformer 2. The conductors 1 are connected to two exciting or regulating transformers 3 and 4 provided with tap changing equipments for adjusting the voltages without interruption of load. Such tap changing devices are well known in the art. The windings of the transformer 3 having star-autotransformer connection, the adjustable secondary voltages of the conductors 5 are in phase with the corresponding main voltages of the line conductors 1. The transformer 4 has delta connected primary windings, its secondary windings being open and connected to the conductors 5 in such a manner as to give secondary voltages which are in quadrature with the corresponding voltages of the transformer 3. The vector sum of the two regulating voltages is supplied to the primary winding of the series transformer 2 by way of an auxiliary transformer 6. The connections of this transformer 6 are such that its secondary voltages are displaced by the angle beta with respect to the primary voltages. The angle beta is complementary to the above mentioned impedance angle alpha of the whole ring circuit.

It is also possible to arrange the transformer 6 for a phase shifting angle alpha, but the first method is more advantageous because the transformer 6 is smaller, the angle alpha being in most cases greater than 45 degrees considering that the reactive component of the impedance of the ring circuit is usually greater than its ohmic component.

In the actual case, the transformer 6 has a delta-autotransformer connection, whereby the primary conductors 7 leading from the regulating transformers 3 and 4 are connected to the corners of the delta. The additional windings 8 of the auxiliary transformer are connected to the corners of the delta winding in such a manner that the voltage of each additional winding is in phase with the delta or main winding opposite to the corner of the delta to which the additional winding is connected, as is obvious from the drawing. With this special method of connection, the secondary voltages of the auxiliary transformer differ little in magnitude from the primary voltages, while differing widely therefrom in phase relation. The voltage delta of the resultant secondary voltages of the transformer 6 is shown in the drawing by dotted lines, and the angle beta is also indicated.

The operation of the arrangement shown in Fig. 3 is as follows: Assume the tap changing devices of both transformers 3 and 4 are in their zero or inactive positions so that in the arrangement shown these are the lower end positions. In this case the auxiliary transformer 6 is short circuited on the primary side, and the series transformer 2 is not introducing any additional voltage into the ring circuit 1.

Assume now that it is desired to control the distribution of the actual power, the tap changing mechanism of the transformer 4 is moved from its zero or inactive position and causes the auxiliary transformer 6 to be energized by a voltage whose phase relation is displaced 90° from the main voltage of the ring circuit 1. By means of the transformer 6 this regulating voltage is shifted by the angle beta. Therefore in the secondary winding of the series transformer 2 an additional voltage becomes operative which has the correct phase relation for controlling the distribution of the actual power. This will be obvious from the following explanation: The phase shifting angle is 90°—beta. Since the angle beta is equal to 90°—alpha, the final value of the phase displacement is alpha. Thus the additional voltage introduced into the ring circuit 1 by regulating the transformer 4 has the phase relation of the voltage $E_w$ as shown in Fig. 2, and consequently the distribution of the actual power is controlled as explained in connection with Fig. 2.

When, however, the wattless power is to be controlled, the transformer 3 is adjusted to give a suitable regulating voltage, which in the same manner as before explained is shifted by the angle beta by means of the transformer 6 and accordingly becomes operative in the transformer 2 with a phase relation suitable for controlling the wattless power, as $E_b$ in Fig. 2. Hence it appears that the distribution of the actual power and also of the wattless power in the ring circuit 1 may be controlled independently of each other by adjusting the transformers 3 and 4 respectively, whereby only four transformers are required. Furthermore, the arrangement shown has the advantage that the transformers 3 and 6 are of relatively small size because of the autotransformer connection.

In the arrangement shown in the drawing, the additional windings 8 of the auxiliary transformer 6 are permanently connected to the circuit, and consequently a certain, although small, voltage drop occurs in them, even if the regulating transformers 3 and 4 are in their inactive or zero positions. For this reason it is desirable to connect between the transformer 6 and the series transformer 2 a short circuiting switch such as the switch 10 shown in Fig. 3, which in the inactive positions of the two regulating transformers, may be used to short circuit the terminals of the exciting windings of the series transformer 2.

The invention provides an efficient and economical method and system for controlling the distribution of actual and wattless power in a polyphase ring circuit and with the advantage that the actual power and the wattless power may be regulated independently as desired.

The invention has been explained by describing a preferred form thereof but it will be apparent that changes may be made without departing from the spirit of the invention and the scope of the appended claims.

What I claim as new and desire to secure by Letters Patent of the United States, is:

1. The combination with the conductors of a polyphase circuit, of two regulating transformers connected to the line conductors of said circuit, the secondary voltages of one regulating transformer being in phase with the line conductor voltages and the secondary voltages of the other regulating transformer being displaced 90° from the line conductor voltages, means for connecting portions of the secondary windings of both regulating transformers in series, a series transformer interconnected in the line conductors of the circuit and being energized by the regulating transformers, and a phase shifting transformer interconnected between the said regulating transformers and the series transformer, said phase shifting transformer being adjusted for a phase shifting angle substantially equal or complementary to the impedance angle of the circuit.

2. The combination with the conductors of a three phase circuit, of an adjustable exciting transformer being star-autotransformer connected, a second exciting transformer being delta-open connected, the secondary windings of the said two transformers being series connected, a delta connected adjustable autotransformer connected in series with said exciting transformers, and a series transformer interconnected in the line conductors of said circuit and being energized by said delta connected autotransformer.

3. The combination with the conductors of a three phase circuit, of an adjustable exciting transformer being star-autotransformer connected, a second exciting transformer being delta-open connected, the secondary windings of the said two transformers being series connected, a delta connected adjustable autotransformer connected in series with said exciting transformers, a series transformer connected to the line conductors of said circuit and being energized by said delta connected autotransformer, and switching means for short circuiting the terminals of the exciting windings of said series transformer when the two exciting transformers are in their inactive or zero positions.

WALTER GUTTSMANN.